United States Patent Office 3,052,676
Patented Sept. 4, 1962

3,052,676
SYNTHESIS OF 11β,12β-ACETONIDES OF 12β-HYDROXY-PREDNISOLONE
John A. Zderic, Howard J. Ringold, and Carl Djerassi, Mexico City, Mexico, assignors, by mesne assignments, to Syntex Corporation, a corporation of Panama
No Drawing. Filed Oct. 2, 1959, Ser. No. 843,946
Claims priority, application Mexico Oct. 11, 1958
12 Claims. (Cl. 260—239.55)

This invention relates to certain new cyclopentanophenanthrene derivatives and to a process for the preparation of the same.

More particularly, it relates to $\Delta^4$-pregnene-11β,12β,17α,21-tetrol-3,20-dione, and derivatives thereof with or without an additional double bond at C-1,2, as well as to their esters and cyclic 11,12-ketals and acetals, which compounds exhibit glycogenic, eosinopenic and catabolic activity, and which are represented by the following general formulas:

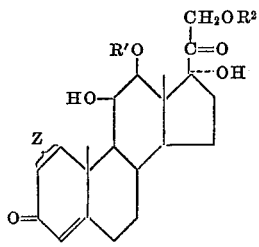

and

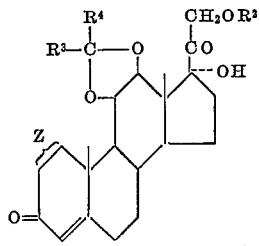

In these formulas $R^1$ and $R^2$ are members of the group consisting of hydrogen and acyl groups derived from hydrocarbon carboxylic acids having up to about 12 carbon atoms; $R^3$ and $R^4$ are members of the group consisting of hydrogen and hydrocarbon radicals having up to about 8 carbon atoms; Z is a carbon-to-carbon linkage selected from the group consisting of single and double bond.

The hydrocarbons from which $R^3$ and $R^4$ are eventually derived can be saturated or unsaturated, of straight, branched, cyclic or mixed straight(branched)-cyclic chain, also including aromatic and mixed aromatic-aliphatic hydrocarbons. The ketals are obtained, for example, by condensation with acetone (acetonides; $R^3$ and $R^4$ are $CH_3$), with methylethylketone ($R^3$ is $CH_3$; $R^4$ is $C_2H_5$), with butanone, benzophenone or cyclohexanone; in the latter case $R^3$ and $R^4$ are part of the cyclohexyl ring. The acetals are formed, for example, with formaldehyde ($R^3$ and $R^4$ are H), with acetaldehyde ($R^3$ is H and $R^4$ is $CH_3$), with benzaldehyde or with furfural. The hydrocarbon carboxylic acids from which $R^1$ and $R^2$ are derived when acyl, can be saturated or unsaturated, of straight, branched, cyclic or mixed straight (or branched)-cyclic chain, unsubstituted or substituted with groups such as methoxy, chlorine or bromine; therefore, the esters among the new compounds include, among others, the acetate, propionate, -butyrate, hemisuccinate, enanthate, caproate, benzoate, trimethylacetate, phenoxyacetate, phenylpropionate, cyclopentylpropionate and 8-chloropropionate.

The starting material used for preparing the novel compounds according to the present invention is 11-keto-12β-hydroxy-diosgenin described by Rothman and Wall in J.A.C.S., 79, 3228 (1957).

The process for preparing the novel compounds according to the invention is illustrated by the following reaction diagram:

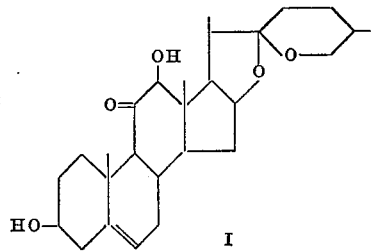

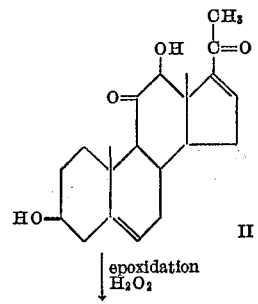

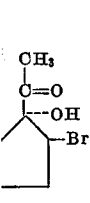

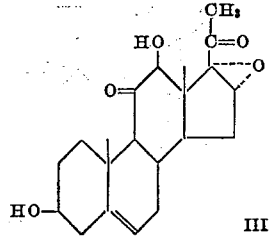

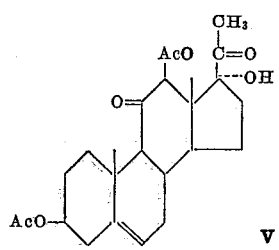
V
ketalization at C-20 →
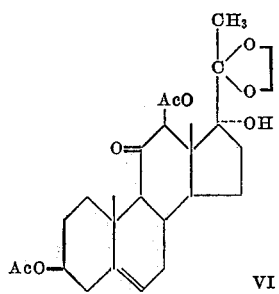
VI
LiAlH₄ tetrahydrofurane ↓
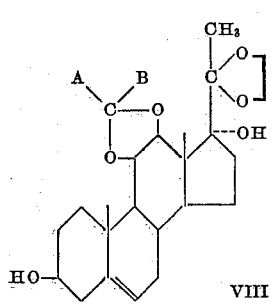
VIII
← ketone or aldehyde
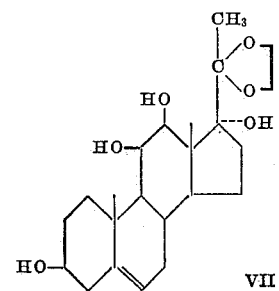
VII
Hydrolysis of ketal at C-20 ↓
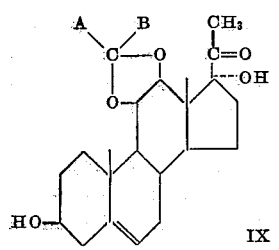
IX
Iodination and acetolysis ↓
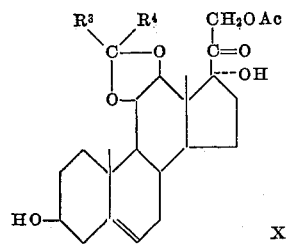
X
oxidation at C-3 →
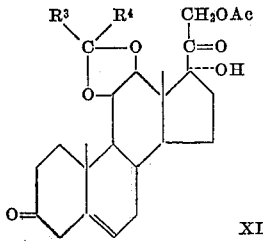
XI
rearrangement and hydrolysis ↓
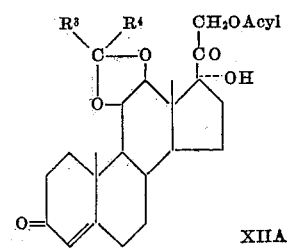
XIIA
← esterification
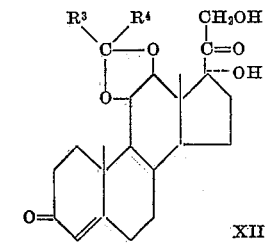
XII
SeO₃ + t-butanol ↓
hydrolysis with lower fatty acid ↓

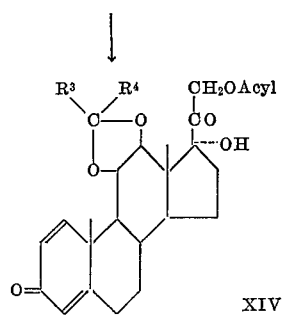

XIV saponification

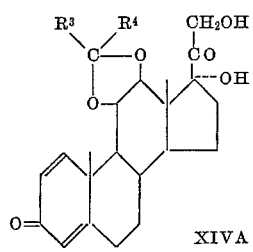

XIVA hydrolysis with lower fatty acid

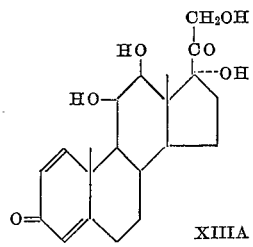

XIIIA esterification →

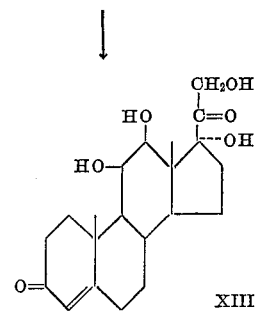

XIII esterification

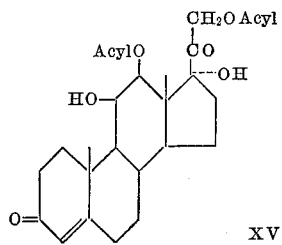

XV

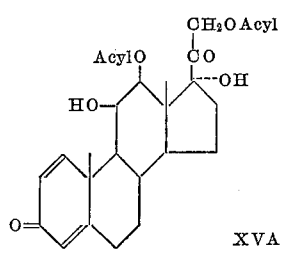

XVA

The side chains of the above mentioned starting compound (I) is degraded by conventional methods for the degradation of the sapogenin spiroketal side chain which comprises heating of the starting compound to 190° C. with acetic anhydride in a sealed tube and subjecting the resulting pseudo-sapogenin to an oxidation followed by hydrolysis, all of which steps are described in detail further below in specific examples to produce $\Delta^{5,16}$-pregnadiene-3β,12β-diol-11,20-dione (II). The double bond at C–16,17 is then epoxidized by reaction with hydrogen peroxide in alkaline medium and the resulting 16α,17α-oxido-compound (III) is treated with hydrogen bromide to obtain a 16,17-bromohydrin; acetylation of the latter at C–3 and C–12 leads to the 3,12-diacetate of 16-bromo-$\Delta^5$-pregnene-3β,12β,17α-triol-11,20-dione (IV), which is debrominated by catalytic hydrogenation to produce the 3,12-diacetate of $\Delta^5$-pregnene-3β,12β,17α-triol-11,20-dione (V). The keto group at C–20 is then protected by formation of its 20-cycloethyleneketal, by refluxing with ethyleneglycol in mixture with benzene, in the presence of p-toluenesulfonic acid and under anhydrous conditions. The resulting 3,12-diacetate of 20-ethylene-dioxy-$\Delta^5$-pregnene-3β,12β,17α-triol-11-one (VI) is refluxed with lithium aluminum hydride in mixture with tetrahydrofurane in order to reduce the keto group at C–11 to the 11β-hydroxyl group, with simultaneous hydrolysis of the acetoxy groups. By reacting the vicinal hydroxyl groups of the resulting 11,12-glycol (VII) with the ketones or aldehydes set forth above, there are obtained the corresponding ketals and acetals in the form of their 20-ethylenedioxy-derivatives (VIII); this reaction was carried out by essentially following the procedure described by Fried et al. in J.A.C.S., 80, 2338 (1958), for the steroidal 16α,17α-glycols, and which consists in the treatment of the glycols with aldehydes or ketones in the presence of catalytic amounts of perchloric acid. The ketal group at C–20 is then selectively hydrolyzed to produce the 11,12-acetonides of $\Delta^5$-pregnene-3β,11β,12β,17α-tetrol-20-one (IX). Optionally, the ketal group at C–20 may be hydrolyzed prior to the formation of the acetonide, preferably in aqueous acetone solution and in the presence of small amounts of p-toluenesulfonic acid. In this manner, for example, the reaction with acetone furnishes the 11, 12-acetonide of $\Delta^5$-pregnene-3β,11β,12β,17α-tetrol-20-one (VIII).

For the purpose of introducing an acetoxy group at C–21, the above-named compound (IX) is caused to react with iodine and calcium oxide which reaction is described by Stork, Ringold, Sondheimer and Rosenkranz in United States Patent No. 2,874,154, granted February 17, 1959, and the resulting 21-iodo compound is acetolyzed by refluxing with potassium acetate in mixture with acetone. There is obtained the 11,12-acetonide of 21-acetoxy-$\Delta^5$-pregnene-3β,11β,12β,17α-tetrol-20-one (X). The hydroxyl group at C–3β is oxidized in acetone solution with an 8N-solution of chromic acid in dilute sulfuric acid to form the 11,12-acetonide of 21-acetoxy-$\Delta^5$-pregnene-11β,12β,17α-triol-3,20-dione (XI). By treatment with dilute methanolic potassium hydroxide under an atmosphere of nitrogen the double bond from $\Delta^5$ is rearranged to $\Delta^4$ under simultaneous hydrolysis of the acetoxy group at C–21, to produce the 11,12-acetonide of $\Delta^4$-pregnene-11β,12β,17α,21-tetrol-3,20-dione (XII).

By heating the above compound (XII) with an aqueous lower aliphatic acid, preferably with 70% formic acid, the ketal group at C–11,12 is hydrolyzed and $\Delta^4$-pregnene-11β,12β,17α,21-tetrol-3,20-dione (XIII) is obtained.

In order to form the 1-dehydro compound corresponding to compound XIII, namely $\Delta^{1,4}$-pregnadiene-11β,12β,-17α,21-tetrol-3,20-dione (XIIIA), it is not recommended to attempt the introduction of the additional double bond into the above compound (XIII) since we have found that secondary reactions will take place which affect one or more of the hydroxyl groups. For this reason the 21-hydroxyl group of the 11,12-acetonide of $\Delta^4$-pregnene-11$\beta$, 12$\beta$,17$\alpha$,21-tetrol-3,20-dione (XII) is esterified by treatment with the anhydride of a carboxylic acid in pyridine solution, and the resulting 11,12-acetonide of the 21-acyloxy-$\Delta^4$-pregnene-11$\beta$,12$\beta$,17$\alpha$-triol-3,20-dione (XIIA) is refluxed with selenium dioxide in mixture with t-butanol, in the presence of catalytic amounts of pyridine and under an atmosphere of nitrogen, thus affording the 11,12-acetonide of the 21-acyloxy-$\Delta^{1,4}$-pregnadiene-11$\beta$,12$\beta$,17$\alpha$-triol-3,20-dione (XIV). By treatment with dilute methanolic sodium methoxide or potassium hydroxide solution, at low temperature and under an atmosphere of nitrogen, there is then obtained the 11,12-acetonide of $\Delta^{1,4}$-pregnadiene-11$\beta$,12$\beta$,17$\alpha$,21-tetrol-3,20-dione (XIV). Upon subsequent treatment with formic acid, as described above, there was hydrolyzed the ketal group to produce $\Delta^{1,4}$-pregnadiene-11$\beta$,12$\beta$,17$\alpha$,21-tetrol-3,20-dione (XIIIA).

The 11,12-glycols of formulas XIII and XIIIA can be treated with the anhydride of any one of the above described hydrocarbon carboxylic acids in pyridine solution to produce their respective 12,21-diesters (XV and XVA).

The entire sequence of reactions as described above may be carried out with another 11,12-ketal or acetal instead of the acetonide which was chosen to illustrate our process.

To those skilled in the art it is obvious that the above-described reactions may be modified within wide limits. For instance, the debromination of the bromohydrin may also be effected by refluxing with Raney nickel; for the reduction of the keto group at C-11 and the concomitant hydrolysis of the acetoxy groups, there may be employed another double hydride such as sodium boron hydride in aqueous methanol instead of lithium aluminum hydride; the dehydrogenation at C-1,2 may also be carried out by incubation with suitable species of *Corynebacterium simplex* such as strain ATCC 6946. The order in which the reactions are carried out may also be changed; thus, for example, instead of subjecting the 11,12-ketal or acetal of $\Delta^4$-pregnene-11$\beta$,12$\beta$,17$\alpha$,21-tetrol-3,20-dione to the successive steps of esterification, dehydrogenation, saponification of the ester group and finally hydrolysis of the ketal group, to obtain as final product $\Delta^{1,4}$-pregnadiene-11$\beta$,12$\beta$17$\alpha$,21-tetrol-3,20-dione, the same product may be obtained by carrying out the steps in the following order: hydrolysis of the ketal group, esterification (which in this case produces a 12,21-diester), dehydrogenation and saponification of the ester groups. Similarly, instead of introducing the 11,12-ketal or acetal group into 20-ethylenedioxy-$\Delta^5$-pregnene-3$\beta$,11$\beta$,12$\beta$,17$\alpha$-tetrol (VII) and then hydrolyzing the ketal group at C-20, one may first eliminate the 20-ketal group and introduce the 11,12-ketal or acetal afterwards, to obtain in both cases the same 11,12-ketal or acetal of formula IX.

The following examples serve to illustrate our invention but do not imply any restrictions of its scope.

*Example I*

A mixture of 10 g. of 11-keto-12$\beta$-hydroxy-diosgenin and 40 cc. of acetic anhydride was heated in a sealed tube for 5 hours to 195° C. The resulting solution was poured under vigorous stirring into 1 liter of water and the mixture was kept standing for 1 hour to decompose the excess of anhydride. The water was decanted and the product was dissolved in methylene dichloride, washed with water, 10% aqueous sodium bicarbonate solution and saturated sodium chloride solution. The solvent was evaporated, the residue dissolved in 100 c. of 80% acetic acid and cooled to about 8° C. There was then added 4.3 g. of chromic acid in 5.5 cc. of 90% acetic acid previously cooled to 4° C. and the resulting mixture was allowed to react for 10 minutes at room temperature and then poured into water to stop the reaction. The desired intermediate product was isolated by extraction with methylene dichloride and the extract was washed with water, 10% aqueous sodium bicarbonate solution and again with water, dried over anhydrous sodium sulfate and evaporated to dryness. The residue was dissolved in 60 cc. of acetone, treated with a solution of 5 g. of potassium hydroxide in 30 cc. of water and the mixture was refluxed for 5 hours. A biphasic mixture was obtained which was poured into water and the desired product was isolated by extraction with methylene dichloride. The extract was washed with water, dried over anhydrous sodium sulfate and evaporated to dryness. There was thus obtained $\Delta^{5,16}$-pregnadiene-3$\beta$,12$\beta$-diol-11,20-dione in crude form, contaminated with small amounts of its 12-monoacetate.

The above crude mixture was dissolved in 130 cc. of chloroform and 310 cc. of methanol, cooled to 0° C. and treated under stirring with 20 cc. of 35% hydrogen peroxide and then dropwise with a solution of 10 g. of sodium hydroxide in 100 cc. of water. The resulting solution was allowed to react at 0° C. for 1 hour further, then at room temperature for 16 hours and finally poured into water to interrupt the reaction. The reaction product was extracted with chloroform, washed with water, dried over anhydrous sodium sulfate and evaporated to dryness. The residue was dissolved in 100 cc. of methanol, treated with 4 g. of sodium hydroxide and refluxed for half an hour in order to complete the hydrolysis of those acetate groups which might have survived the previous treatments. The resulting solution was poured into aqueous saturated sodium chloride solution and the product was extracted with ethyl acetate. Upon subsequent chromatography of the ethyl acetate extract on neutral alumina there was obtained the 16$\alpha$,17$\alpha$-epoxide at $\Delta^5$-pregnene-3$\beta$,12$\beta$-diol-11,20-dione.

The above epoxide was dissolved in pyridine, treated with acetic anhydride and heated on a steam bath for 1 hour. After pouring the mass into water, stirring for 1 hour and extracting with chloroform there was obtained the diacetate of 16$\alpha$,17$\alpha$-oxido-$\Delta^5$-pregnene-3$\beta$,12$\beta$-diol-11,20-dione.

To a solution of 1.90 g. of the above diacetate in 23 cc. of glacial acetic acid there was added at room temperature and under stirring 1.14 cc. of saturated hydrogen bromide solution in acetic acid. After half an hour the mixture was poured into water and the precipitate was collected by filtration and washed with water to neutral. There was thus obtained the crude 3,12-diacetate of 16$\beta$-bromo-$\Delta^5$-pregnene-3$\beta$,12$\beta$,17$\alpha$-triol-11,20-dione. The crude bromohydrin was dissolved in 57 cc. of ethanol and stirred overnight with 3.4 g. of 2% Pd/CaCO$_3$ under an atmosphere of hydrogen. The suspension was filtered through celite, the filter was washed with hot ethanol and the combined filtrate and washings was evaporated to dryness. Crystallization of the residue from methanol yielded the 3,12-diacetate of $\Delta^5$-pregnene-3$\beta$,12$\beta$,17$\alpha$-triol-11,20-dione.

A mixture of 5 g. of the 3,12-diacetate of $\Delta^5$-pregnene-3$\beta$,12$\beta$,17$\alpha$-triol-11,20-dione, obtained as described above, 300 cc. of anhydrous benzene, 35 cc. of ethyleneglycol and 250 mg. of p-toluenesulfonic acid was refluxed for 12 hours with the use of a water separator. The cooled mixture was treated with 50 cc. of 2 N sodium carbonate solution and 500 cc. of water and the organic layer was separated, washed with water, dried over anhydrous sodium sulfate and evaporated to dryness under reduced pressure. There was thus obtained the 3,12-diacetate of 20-ethylenedioxy-$\Delta^5$-pregnene - 3$\beta$,12$\beta$,17$\alpha$ - triol-11-one, which was used for the next step without further purification. In another experiment, this compound was purified by chromatography on neutral alumina.

A solution of 5 g. of the above crude compound in 150 cc. of anhydrous tetrahydrofurane was slowly added to a stirred suspension of 1.5 g. of lithium aluminum hydride in 100 cc. of anhydrous tetrahydrofurane and the mixture was refluxed for 4 hours. The excess of hydride was decomposed by the addition of a few drops of acetone, then 15 cc. of aqueous saturated sodium sulfate solution was added followed by anhydrous sodium sulfate, the solids were removed by filtration and the filtrate was evaporated to dryness. The residue crystallized from acetone-hexane to give 20-ethylenedioxy-$\Delta^5$-pregnene-3$\beta$,11$\beta$,12$\beta$,17$\alpha$-tetrol.

A mixture of 4 g. of the above compound and 150 cc. of acetone was treated dropwise with 1.5 cc. of 70% perchloric acid, under stirring at room temperature; after the steroid had dissolved completely, the mixture was stirred at room temperature for 30 minutes further, then poured into 5% aqueous sodium bicarbonate solution and the formed precipitate was collected, washed with water and dried. There was thus obtained 11$\beta$,12$\beta$-isopropylidenedioxy - 20 - ethylenedioxy-$\Delta^5$-pregnene-3$\beta$,17$\alpha$-diol, namely the 11,12-acetonide of the cyclic 20-ethyleneketal of $\Delta^5$-pregnene-3$\beta$,11$\beta$,12$\beta$,17$\alpha$-tetrol-20-one; this product was of sufficient purity for its use in the following step.

A mixture of 4 g. of the above compound, 100 cc. of acetone, 5 cc. of water and 500 mg. of p-toluenesulfonic acid was stirred at room temperature for 6 hours, poured into 500 cc. of water and the precipitate was collected, washed with water, dried and recrystallized from acetone-hexane. There was thus obtained the 11,12-acetonide of $\Delta^5$-pregnene-3$\beta$,11$\beta$,12$\beta$,17$\alpha$-tetrol-20-one.

To a solution of 3 g. of the above compound in 22.5 cc. of tetrahydrofurane and 13.5 cc. of methanol there were added slowly under stirring 4.5 g. of pure calcium oxide, followed by the addition of 4.5 g. of iodine in small portions, and the mixture was stirred at room temperature until a pale yellow color persisted in the mixture. The latter was then poured into ice water containing 13.5 cc. of acetic acid and 1.5 g. of sodium thiosulfate, stirred for 15 minutes, most of the liquid was decanted and the precipitate was collected by filtration, thus affording 11$\beta$,12$\beta$ - isopropylidenedioxy-21-iodo-$\Delta^5$-pregnene-3$\beta$,17$\alpha$-diol-20-one.

The above compound was washed with water, dried under vacuum, mixed with 75 cc. of anhydrous acetone and 6 g. of recently fused potassium acetate and the mixture was refluxed under anhydrous conditions for 18 hours; the acetone was removed by distillation and the residue was treated with water. The water was decanted from the oil which separated, and which was then dissolved in methylene chloride. The solution was washed with water, dried over anhydrous sodium sulfate and the methylene chloride was evaporated.

The residue was mixed with 750 mg. of sodium bisulfite dissolved in 27.6 cc. of methanol and 7.5 cc. of water, and refluxed for 15 minutes. The solvent was distilled under reduced pressure, ice water was added to the residue and the precipitate was collected, washed with water, dried and recrystallized from acetone-hexane. There was thus obtained the 21-acetate of 11$\beta$,12$\beta$-isopropylidenedioxy-$\Delta^5$-pregnene-3$\beta$,17$\alpha$,21-triol-20-one.

To a suspension of 2.5 g. of the above compound in 100 cc. of acetone recently distilled over potassium permangate was slowly added in the course of 10 minutes an 8 N solution of chromic acid, under stirring, at 0° C. and under an atmosphere of nitrogen, until the brown-red color of the chromic acid persisted in the mixture; the solution of chromic acid had been prepared by dissolving 26.7 g. of chromium trioxide in 23 cc. of concentrated sulfuric acid and diluting with distilled water to 100 cc. The mixture was stirred for 5 minutes further at room temperature, diluted with water and the formed precipitate was collected, washed with water, dried and recrystallized from acetone-hexane. There was thus obtained the 11,12-acetonide of 21-acetoxy-$\Delta^5$-pregnene-11$\beta$,12$\beta$,17$\alpha$-triol-3,20-dione.

A mixture of 2 g. of the above compound and 20 cc. of methanol containing 200 mg. of potassium hydroxide was stirred at room temperature at 0° C. and under an atmosphere of nitrogen for 1 hour. After dilution with water, the formed precipitate was collected, washed with water, dried and recrystallized from acetone-hexane. There was thus obtained the 11,12-acetonide of 12$\beta$-hydroxy-cortisol (cortisol=hydrocortisone).

A solution of 1 g. of the above compound in 10 cc. of pyridine was treated with 1 cc. of acetic anhydride and allowed to react overnight at room temperature. The reaction mixture was then poured into water, heated for half an hour on a steam bath, cooled, and the precipitate was collected, washed with water, dried and recrystallized from acetone-hexane, thus furnishing 11$\beta$,12$\beta$-isopropylidenedioxy - 21 - acetoxy-$\Delta^4$-pregnen-17$\alpha$-ol-3,20-dione, namely the 11,12-acetonide of the 21-acetate of 12$\beta$-hydroxycortisol.

A mixture of 1 g. of the above compound, 50 cc. of t-butanol, 400 mg. of recently sublimed selenium dioxide and a few drops of pyridine was refluxed for 48 hours under an atmosphere of nitrogen, then filtered through celite, the filter was washed with a little hot ethyl acetate and the combined filtrate and washings were evaporated to dryness under reduced pressure. The residue was dissolved in acetone, treated with decolorizing charcoal, reflexed for 1 hour, filtered and the filtrate was evaporated to dryness. The residue was chromatographed on neutral alumina, thus yielding 11$\beta$,12$\beta$-isopropylidenedioxy-21-acetoxy-$\Delta^{1,4}$-pregnadien-17$\alpha$-ol-3,20-dione.

*Example II*

By replacing in the procedure of the preceding example the acetone by acetaldehyde (under the form of paraldehyde, in mixture with benzene) in the step of the reaction with 20-ethylenedioxy-$\Delta^5$-pregnene-3$\beta$,11$\beta$,12$\beta$,17$\alpha$-tetrol-, instead of the acetonide there was obtained the 11$\beta$,12$\beta$-ethylidenedioxy-compound and, therefore, the subsequent process steps furnished the 11$\beta$,12$\beta$-ethylidenedioxy-compounds instead of the 11$\beta$,12$\beta$-isopropylidenedioxy-compounds.

*Example III*

A mixture of 5 g. of 20-ethylenedioxy-$\Delta^5$-pregnene-3$\beta$,11$\beta$,12$\beta$,17$\alpha$-tetrol obtained as described in Example I, 120 cc. of acetone and 600 mg. of p-toluenesulfonic acid was kept overnight at room temperature, then diluted with water and the precipitate was collected by filtration and dried, thus affording $\Delta^5$-pregnene-3$\beta$,11$\beta$,12$\beta$,17$\alpha$-tetrol-20-one. The latter was caused to react with acetone in the presence of perchloric acid, as described in Example I, to produce the 11,12-acetonide of $\Delta^5$-pregnene-3$\beta$,11$\beta$,12$\beta$,17$\alpha$-tetrol-20-one.

The above compound was treated at 0° C. with a 1% methanolic solution of potassium hydroxide, as described in Example I. There was thus obtained the 11,12-acetonide of 12$\beta$-hydroxy-hydrocortisone, identical with the final compound described in Example I.

A mixture of 2 g. of the above compound, 10 cc. of pyridine and 2 cc. of propionic anhydride was kept overnight at room temperature and the product was then isolated as described in Example I for the preparation of the acetate, thus furnishing the 21-propionate of the 11,12-acetonide of 12$\beta$-hydroxy-hydrocortisone. The latter was dehydrogenated by reaction with selenium dioxide, in accordance with the method of Example I. There was thus obtained the 21-propionate of the 11,12-acetonide of 12$\beta$-hydroxy-prednisolone. Upon treatment with potassium hydroxide, by the method described previously, there was obtained the 11,12-acetonide of 12$\beta$-hydroxy-prednisolone.

*Example IV*

A mixture of 5 g. of the 11,12-acetonide of 12$\beta$-hydroxyhydrocortisone, prepared as described in Examples I and III, and 200 cc. of 60% formic acid was heated on the stream bath for half an hour, cooled, diluted with ice water and the precipitate was collected, washed with water, dried and recrystallized from acetone-hexane. There was thus obtained Δ⁴-pregnene-11β,12β,17α,21-tetrol-3,20-dione (12β-hydroxy-cortisol).

3 g. of the above glycol was mixed with 15 cc. of pyridine and 8 cc. of acetic anhydride and heated at 95° C. for 3 hours. After cooling, the mixture was poured into water, heated for half an hour on the steam bath, cooled and the precipitate was collected, thus affording the 12,21-diacetate of Δ⁴-pregnene-11β,12β,17α,21-tetrol-3,20-dione.

A mixture of 3 g. of the above compound, 150 cc. of t-butanol, 1.2 g. of selenium dioxide and 0.5 cc. of pyridine was refluxed for 48 hours under an atmosphere of nitrogen and the reaction product was then isolated as described in Example I for the dehydrogenation with selenium dioxide. There was thus obtained the 12,21-diacetate of Δ¹,⁴ - pregnadiene - 11β,12β,17α,21-tetrol-3,20-dione. Upon subsequent treatment with dilute methanolic potassium hydroxide, in accordance with the method of hydrolysis described in Example I, there was then obtained the free Δ¹,⁴-pregnadiene-11β,12β,17α,21-tetrol-3,20-dione.

1 g. of the above compound was treated with paraldehyde in benzene solution, in accordance with the method of Example II, to produce 11β,12β-ethylidenedioxy-Δ¹,⁴-pregnadiene-17α,21-diol-3,20-dione. In accordance with the method described in Example I for the acetylation of the acetonide of 12β-hydroxy-cortisol, there was then obtained 21-acetoxy-11β,12β-ethylidenedioxy-Δ¹,⁴-pregnadien-17α-ol-3,20-dione, 21-acetate of the 11,12-(formaldehyde)-acetal of 12β-hydroxy-prednisolone.

We claim:
1. 12β-hydroxy-prednisolone.
2. A 21-ester of 12β-hydroxy-prednisolone and of a hydrocarbon carboxylic acid having up to about 12 carbon atoms.
3. A 12,21-diester of 12β-hydroxy-prednisolone of a one hydrocarbon carboxylic acid having up to about 12 carbon atoms.
4. A Δ⁴-pregnene derivative corresponding to the general formula

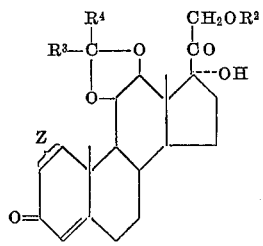

in which R² is a member of the group consisting of hydrogen and acyl groups derived from hydrocarbon carboxylic acids having up to about 12 carbon atoms, R³ and R⁴ are members of the group consisting of hydrogen and hydrocarbon radicals having up to about 8 carbon atoms and Z is selected from the group consisting of a double bond between C–1 and C–2 and a saturated linkage between C–1 and C–2.

5. A compound selected from the group consisting of Δ⁵,¹⁶-pregnadiene-3β,12β-diol-11,20-dione, and its diacetate.
6. 16β - bromo - Δ⁵-pregnene-3β,12β,17α-triol-11,20-dione 3,12-diacetate.
7. The 20-cycloethyleneketal of Δ⁵-pregnene-3β,12β,17α-triol-11,20-dione.
8. A compound of the following formula:

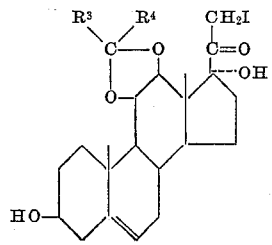

wherein R³ and R⁴ are members of the group consisting of hydrogen and hydrocarbon radicals having up to about 8 carbon atoms.

9. A compound of the following formula:

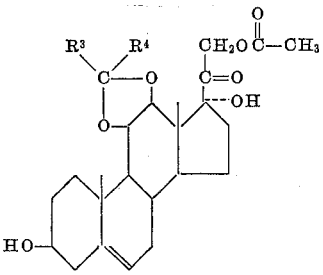

wherein R³ and R⁴ are members of the group consisting of hydrogen and hydrocarbon radicals having up to about 8 carbon atoms.

10. A compound of the following formula:

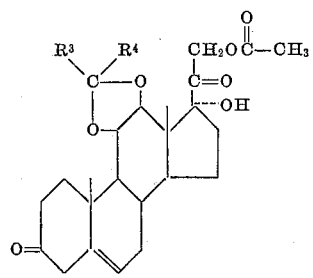

wherein R³ and R⁴ are members of the group consisting of hydrogen and hydrocarbon radicals having up to about 8 carbon atoms.

11. A compound of the following formula:

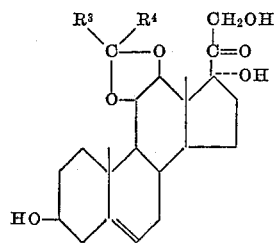

wherein R³ and R⁴ are members of the group consisting of hydrogen and hydrocarbon radicals having up to about 8 carbon atoms.

12. A compound of the following formula:

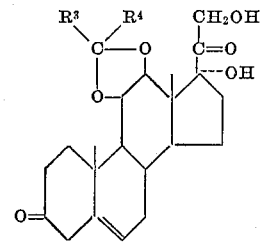

wherein R³ and R⁴ are members of the group consisting of hydrogen and hydrocarbon radicals having up to about 8 carbon atoms.

References Cited in the file of this patent
UNITED STATES PATENTS

| | | |
|---|---|---|
| 2,837,464 | Nobile | June 3, 1958 |
| 2,899,428 | Rothman et al. | Aug. 11, 1959 |
| 2,900,382 | Sondheimer et al. | Aug. 18, 1959 |